United States Patent [19]

Gordenker et al.

[11] Patent Number: 5,617,269
[45] Date of Patent: Apr. 1, 1997

[54] SYSTEM FOR RECORDING TRACK-CENTERING SERVO SIGNALS ON MULTI-TRACK MAGNETIC MEDIUM

[75] Inventors: Robert J. M. Gordenker, Ann Arbor; Lawrence J. Tucker, Whitemore Lake; Michael E. Murphy, Ann Arbor, all of Mich.

[73] Assignee: Conner Peripherals, Inc., San Jose, Calif.

[21] Appl. No.: 195,580

[22] Filed: Feb. 14, 1994

Related U.S. Application Data

[63] Continuation of Ser. No. 813,198, Dec. 23, 1991, abandoned.

[51] Int. Cl.⁶ .................................................. G11B 5/584
[52] U.S. Cl. ............................. 360/77.12; 360/121
[58] Field of Search ....................... 360/77.01, 77.12, 360/121, 122

[56] References Cited

U.S. PATENT DOCUMENTS

| | | | |
|---|---|---|---|
| 2,915,597 | 12/1959 | Wanlass et al. | 360/121 |
| 3,526,885 | 9/1970 | Anderson | 360/122 |
| 4,164,764 | 8/1979 | Joannou | 360/77.12 X |
| 4,176,381 | 11/1979 | deNiet et al. | 360/77.12 |
| 4,322,763 | 3/1982 | Lemke | 360/115 |
| 4,472,750 | 9/1984 | Klumpp et al. | 360/78.13 X |
| 4,541,021 | 9/1985 | Konishi et al. | 360/72.1 X |
| 4,677,505 | 6/1987 | Nukada et al. | 360/77.12 |
| 4,977,468 | 12/1990 | Aruga et al. | 360/75 |
| 4,979,051 | 12/1990 | Eggebeen | 360/21 |
| 4,996,609 | 2/1991 | Joannou | 360/57 |
| 4,996,677 | 2/1991 | Naito et al. | 369/14 |
| 5,121,270 | 6/1992 | Alcudia et al. | 360/77.01 |
| 5,132,861 | 7/1992 | Behr et al. | 360/121 |

OTHER PUBLICATIONS

Zimmerman et al. "Serlo Control of Multi Element Magnetic Heads" IBM TDB vol. 15 No. 4 Sep. 1972 360/77.12 pp. 1320–1321.

*Primary Examiner*—Aristotelis Psitos
*Assistant Examiner*—James T. Wilson
*Attorney, Agent, or Firm*—Fliesler, Dubb, Meyer & Lovejoy

[57] ABSTRACT

A multi-track servo recording head includes a multi-tip write core for simultaneously writing a plurality of tracking signals on magnetic storage media. The magnetic recording head may include an optical edge sensor and a magnetic edge sensor for sensing the position of the recording head relative to the edge of the storage media. Additionally, a read core is provided to detect the longitudinal position of the storage media relative to the recording head during media transport.

29 Claims, 4 Drawing Sheets

SYSTEM FOR RECORDING TRACK-CENTERING SERVO SIGNALS ON MULTI-TRACK MAGNETIC MEDIUM

This application is a continuation of Ser. No. 07/813,198, filed Dec. 23, 1991, now abandoned.

BACKGROUND OF THE INVENTION

The present invention relates generally to data recording and more particularly to recording heads and other such transducers for recording signals on storage media. Still more particularly, in the most preferred form, the invention relates to recording heads for recording servo-tracking signals on storage media, especially in the form of numerous parallel tracks.

Substantial effort and progress continues toward the goal of increasing the amount of data recorded on a given surface area of record member i.e., storage media. It is essential to the achievement of increased data densities to store each magnetic data signal on the smallest possible surface area of the storage media while retaining the capability of reliably recovering the data stored on the media. This reduction in the surface area necessary to store a magnetic data signal includes placing data-bit signals closer together, which in turn involves increasing the number of data tracks per given surface area of storage media by narrowing the data tracks and placing them closer together.

A significant impediment to accurate recording and recovery of data stored on narrow, closely spaced, tracks on tape media is lateral wander of the record member as it moves longitudinally over the recording head. As data tracks are narrowed and placed closer together, the spacing between the tracks cannot accommodate the lateral wander of the tape media, and consequently a transducer initially aligned to one track may become misaligned as the media is transported past the transducer. Tape wander may take the form of excursions of comparatively large magnitude, both longitudinally to and laterally with respect to the transducer, especially during stopping and starting conditions, but also during steady state longitudinal transport. These large excursions make accurate alignment of the recording head relative to the storage media particularly difficult. Because of the somewhat random occurrence and presence of such conditions, and the nonuniformity of movements of the tape itself, accurate alignment of the recording head relative to the storage media becomes an increasingly important factor as track density increases and the tracks are arranged closer together.

To compensate for lateral tape wander and in an effort to maintain a controlled lateral recording head position relative to the storage media, servo systems have been developed which physically manipulate the recording head position in response to that of the storage media as it is transported past the head. Particularly advantageous servo systems are described in U.S. Pat. No. 4,472,750, issued Sep. 18, 1984 to Klumpp et al., entitled DATA RECORD WITH PRERECORDED TRANSDUCER POSITIONING SIGNALS AND SYSTEM FOR UTILIZING SAME, and U.S. Pat. No. 4,586,094, issued Apr. 29, 1986 to Chambers et al., entitled METHOD AND APPARATUS FOR PRE-RECORDING TRACKING INFORMATION ON MAGNETIC MEDIA, both of which are assigned to the assignee of the present invention. These sedco systems use servo-tracking centering-signals prerecorded on the storage media as a reference for the recording head, and continuously adjust the position of the recording head to keep it accurately aligned, relative to any selected one of several long tracks of servo signals disposed along the tape.

Although these servo-tracking systems allow significant reduction in the track width and the spacing between tracks on the record member, the ability of manufacturers of magnetic storage systems to make further reductions in the track width, and the spacing between the tracks on the record member, is limited by the ability of transducers to accurately record servo-tracking signals which are narrower and spaced closer together. Known transducers for writing servo-tracking centering-signals on a record member use a write core which sequentially writes the servo-tracking signals for each track by embedding the centering-signals on the storage media one track at a time. Consequently, the servo system is required to accurately, and with high precision, position the recording transducer in each track as the write core records the tracking signal for that track. Due to the excursions of the record member relative to the transducer head, both laterally and longitudinally to the transducer, which occur during stopping and starting as well as steady state transport of the record member, and since recording tape is under tension as it is transported lengthwise, which tension varies subjecting tape media to different amounts of stretching, it is difficult and impractical for a system using a single track write core to accurately align servo-tracking centering-signals longitudinally and laterally as the number of tracks on the storage media increases.

In addition to the difficulties encountered in accurately positioning the single-track transducer for recording the servo-tracking centering-signals due to lateral excursions of the storage media, and longitudinal offsets due to repeated transport of the storage media past the transducer, expended writing centering-signals increases as the number of tracks increase. This increase occurs because the entire length of the record member must be transported past the transducer as the centering signals for each individual track of the storage media are recorded. For storage media having a large number of tracks, the time required to repeatedly transport the storage media past the transducer and record the centering signals becomes excessively large. For example, a forty-track quarter-inch recording tape would require 41 recording passes to record the servo-tracking centering signals by use of such single-track transducer procedures.

Multiple-gap transducers are known which are capable of reading or writing signals from a plurality of different data tracks simultaneously. However, a number of characteristics of these transducers prevent them from being truly effective or desirable for recording multiple-track servo-tracking signals for high density data storage. For example, stacked-core transducers include multiple cores isolated magnetically from each other and having respective gaps which are spaced apart by a distance at least equal to one track width. These transducers are relatively complex in construction and thus are costly to manufacture due to the number of cores and windings which make up the transducer. Additionally, it is necessary to balance the different transducer cores to compensate for variations in the flux generated by respective ones of the cores, in an effort to produce generally uniform signals from all the cores. Further, the physical dimensions of each of the cores which form the respective gaps of such stacked-core transducers limit the number of cores which can be stacked for a particular width of tape due to the thickness of the core material required to give the legs of the core structural strength and a geometry for generating flux in the storage media. The width of the respective cores added to the thickness of the magnetic insulator between each core essentially prevents the use of stacked-core transducers to record adjacent, closely spaced, tracks.

SUMMARY OF THE INVENTION

The present invention provides an apparatus for obviating the aforementioned shortcomings and difficulties associated with prior art transducers, and in particular, transducers for use in simultaneously writing a large number of parallel tracks of information especially servo-positioning information, particularly on magnetic storage media. In accordance with the invention, new and more effective transducers are provided having a number of distinct features which vary in both concept and implementation from those found in prior art devices, and which combine synergistically to provide improved transducers having new and enhanced capabilities.

In one aspect of the invention, a transducer is disclosed which includes a write core having multiple write-core tips which are separated by slot-like recesses (i.e., "gaps"). The multiple-tip, single-core, recording-head transducers provide precise lateral spacing of the write-core tips and allow servo-tracking head-centering signals to be recorded on the storage media which are narrowly spaced and accurately aligned, both longitudinally and laterally, as flux is generated through the write core and applied to the storage media by all of the write-core tips simultaneously.

In another aspect of the invention, a transducer includes an optical sensor for sensing the edge of the record member. The optical sensor generates output signals proportional to the position of the transducer relative to the record member throughout the longitudinal transport of the record member, whereby such position is accurately known at all times and corrective positioning or other related activity may be instituted at any time.

In yet another aspect of the invention, a recording head includes magnetic sensors ("read" heads) for magnetically sensing the position of the transducer relative to the record member. The magnetic sensors can be utilized to sense the longitudinal position and the lateral position of the transducer relative to the record member by using previously recorded signals.

Some of the more salient objectives, advantages and features of the invention are: to provide a highly effective method and apparatus for producing an embedded servo-record member, particularly a tape-type record member but also potentially other forms of recording technology; to provide a new and useful form of transducer for recording multi-tracking signals simultaneously such that corresponding magnetic transitions may be written for all the tracks on the record member simultaneously, thereby assuring uniform relative positioning of all such signals on the storage media; to provide a transducer having substantial manufacturing economics which is highly suitable for precise geometric positioning of multi-recorded signals on the record member simultaneously and which has write-core tips providing a very durable surface for contacting the record member; to provide a transducer having physical and magnetic uniformity throughout the write core, whereby uniform signal fluxes are generated at all write-core tips for all of the different but related signals to be simultaneously recorded at any given instant; to provide a system for use with multi-track record members which significantly reduces the time required to write servo-tracking signals thereupon; to provide a transducer which includes a sensor for generating servo-positioning signals throughout the longitudinal transport of the record member; to provide a transducer having multiple sensors for providing feedback on the position of the transducer relative to the lateral edge of the record member as well as to the longitudinal position of the write cores relative to previously recorded signals; and to provide multiple sensors for sensing the edge of the record member, and thus provide a system which generates a confirmation of the lateral position detected by each sensor.

The foregoing features, advantages and objectives of the invention will become more apparent and will be better understood by consideration of the ensuing specification and its appended claims, particularly in view of the accompanying drawings.

DETAILED DESCRIPTION OF THE PREFERRED EMBODIMENTS

Figure 1:
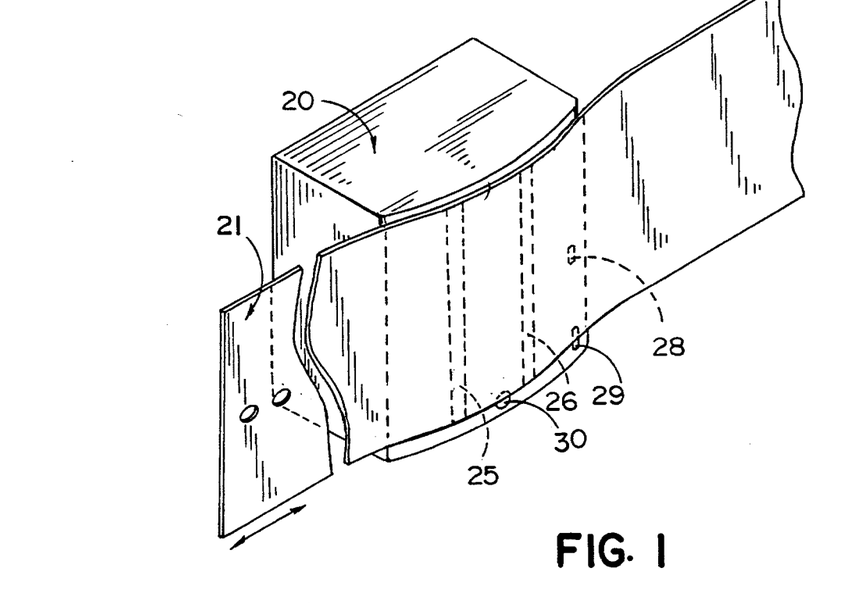
FIG. 1 is a perspective fragmentary view of a recording head according to the invention shown with a record member having servo-tracking signals recorded thereon.

Referring now in more detail to the drawings, and the illustrative embodiments depicted therein, a multi-track servo recording head 20 is generally illustrated in FIG. 1 in operative relation with a tape-form record member 21. In the most preferred form, head 20 is for recording servo-tracking (track-centering) signals 22 (FIG. 11) on record member 21, which may be magnetic tape of the type typically provided in cartridges or cassettes, for example, quarter-inch tape. Of course, it will be understood that the principles and features of the recording head of the preferred embodiment, and the component transducers provided therein, may be applied to other recording heads and transducers used with other storage media, such as discs.

Figure 5:
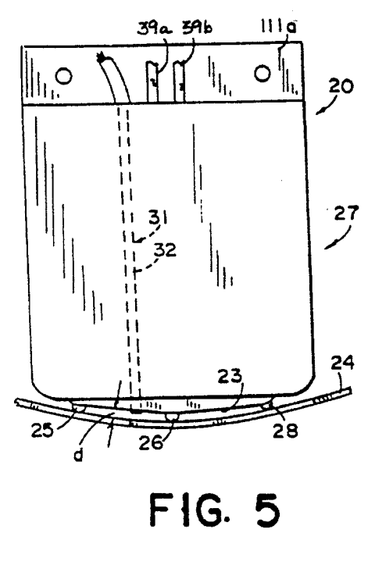
FIG. 5 is an overhead plan view of the device shown in FIG. 2, shown with a record member contacting the recording head.
Figure 6:
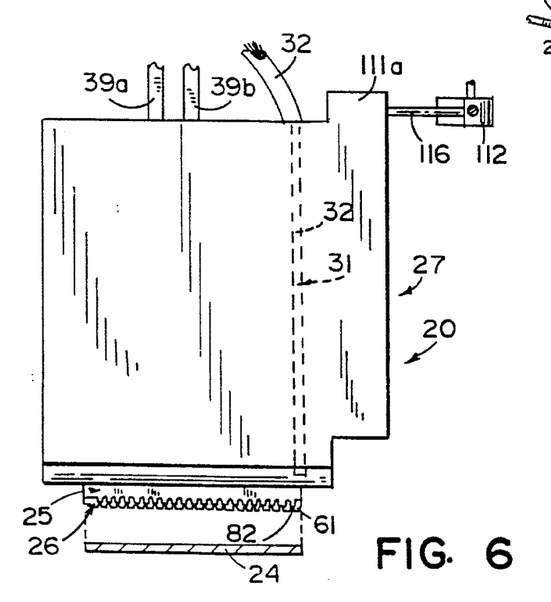
FIG. 6 is a side elevational view of the device shown in FIG. 2 with a record member shown on spaced juxtaposition.

Recording head 20, in the most preferred embodiment of the invention, is for writing the servo-tracking signals 22 on record member 21, and includes a housing 27 (FIG. 2) having a front surface 23 which faces the storage surface 24 of record member 21 (illustrated in FIGS. 5 and 6), when the record member is inserted into a data recorder (not shown) in which recording head 20 is assembled. Surface 23 of recording head 20 includes two elongate servo-signal recording comb-transducers 25 and 26 (FIG. 2) projecting therethrough, a pair of magnetic signal-reading transducers 28, 29 projecting through surface 23 and spaced laterally approximately equal distances from comb-transducer 26, and a light-guide aperture 30 through which light from a light guide 32 of an optical sensor 31 (FIG. 8) emanates and through which light enters into light guide 32. Light guide 32, which extends between aperture 30 and optical circuit 109, is disposed in housing 23 of head 20 (as illustrated in FIGS. 5 and 6) and cables 39a and 39b are coupled to head 20 and comprise the electrical connection of transducers 25, 26, 28 and 29 to a microcontroller 124 (FIG. 8) comprising part of the recorder (not shown).

With first reference to the comb transducers 25, 26 these transducers extend substantially in parallel to one another in face 23 of head 20, for recording narrow, closely-spaced, servo-tracking signals 22, as described in greater detail hereinafter. Transducers 25 and 26 are substantially identical, and accordingly, only transducer 26 is described in greater detail hereinafter, although it is to be understood that the description of transducer 26 applies equally to transducer 25 aside from those differences particularly pointed out below. Transducer 26 includes a write core 33 (FIG. 3) having multiple write-core tips 40, 41, etc., each at the end of a respective one of multiple fingers of a uniform dimension which project outwardly from the write core 33, and an energizing coil 34 wrapped around the rearward legs 35 and 36 of the core. The illustrated write-core tips 40, 41, ect. have respective media contact surfaces 40a, 41a, ect. (FIG. 4) which are smoothly curved and thereby cause the illustrated fingers to be generally semi-cylindrical, where they extend from the core. The fingers and their respective write-core tips 40, 41 etc., are separated by respective slot-like recesses 62, 63, etc., which are also of a uniform dimension.

Figure 3:
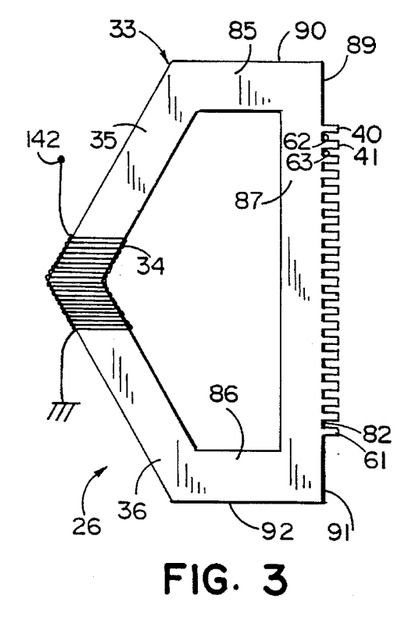
FIG. 3 is an enlarged side elevational view of a multi-tip transducer according to the invention used in the device shown in FIG. 2.
Figure 4:
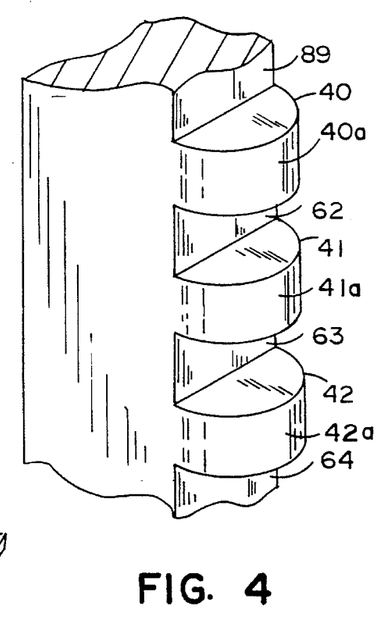
FIG. 4 is an enlarged perspective, fragmentary, view of the transducer shown in FIG. 3.

Somewhat more specifically, in the preferred embodiment disclosed herein core 33 comprises a generally D-shaped member having five legs 35, 36 and 85–87 inclusive. The slots or "gaps" 62, 63, etc., a top offset 89 which extends between the top 90 of core 33 and the uppermost finger of write-core tip 40, and a bottom offset 91 which extends between the bottom 92 of core 33 and the finger of bottom write-core tip 61, are milled into the long, straight, front leg 87 of core 33. Core 33 is most preferably formed of a ferrite material of the type frequently used commercially for magnetic transducer cores, which is a long-wearing durable core material that is readily and accurately machinable. In one preferred embodiment of the invention, transducer 26 includes twenty-one write-core tips in its core 33. The write core of transducer 25 is substantially the same as write core 33 except that it includes twenty write-core tips. As will be understood, the slots between the tips of comb transducer 25 are laterally offset from those of transducer 26 when the two cores are assembled in housing 27, such that none of the tips in transducer 25 will record a signal which will overlap a signal recorded by transducer 26. Twenty-one tip transducer 26 and twenty-tip transducer 25 serve to write a total of forty-one "tracks" (i.e., laterally aligned sequence) of servo bursts, which together define the center of forty data tracks, each pair of vertically-offset bursts defining one data track.

Control signals are applied to coil 34 via a terminal 142 from microcontroller 124 (FIG. 8) of the recorder (not shown), via an interface circuit 143. A terminal 145 is also coupled to microcontroller 124 via interface circuit 143, for connection to the energizing coil (not shown) of transducer 25. As will be understood, interface circuit 143 provides appropriate isolation and signal amplification between transducers 25, 26 and microcontroller 124. Isolation circuit 143 receives control signals from microcontroller 124 via signal bus 144.

The magnetic transducer 28 for reading signals recorded on the record member 12, as described hereinafter, includes a core 96 (FIG. 7) having a leg 98 around which is wound a coil 97, having a terminal 94. As will be understood, the basic purpose of core 96 is to read magnetic signals recorded on record member 21, and thus, core 96 defines a gap 104 for contacting record member 21 as it is transported past the recording head 20.

Figure 7:
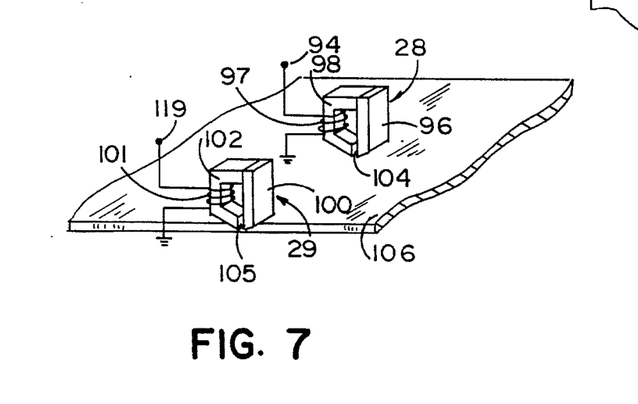
FIG. 7 is an enlarged perspective view showing in isolation a pair of transducers used in the device of FIG. 1, disposed in position with respect to the record member.

Magnetic transducer 29 similarly includes a core 100, including a leg 102 and coil 101, including terminal 119. Transducer 29 is also a magnetic read head, and its basic purpose is to provide an analog signal corresponding in magnitude to the lateral position of the storage media 106 relative to the recording head 20 during media transport. Thus, core 100 includes a gap 105 which extends over an edge 106 of the record member 21 to generate signals for input to servo system 113 as record member 21 is transported past the recording head 20.

Magnetic-read transducers 28, 29 may comprise commercially available devices in and of themselves, although the particular use and implementation of such transducers in a multi-component recording head such as that disclosed herein is believed to constitute a novel and desirable feature itself. Apart from this, gap 104 in transducer 28 is spaced a distance $Y_1$ (FIG. 2) from core 33 of transducer 26 and gap 105 in transducer 29 is spaced a distance $Y_2$ from the latter, distances $Y_1$ and $Y_2$ being substantially equal. In a most preferred embodiment of the invention, distances $Y_1$ and $Y_2$ are substantially equal to a distance X, which is the distance between the core of comb transducer 25 and that of transducer 26. In the most preferred embodiment, transducer 28 is aligned with the center write-core tip of core 33, and its core 96 has a width $W_1$, which is greater than the width of such write-core tip, core 96 extending laterally over a distance substantially equal to that of a pair of adjacent write-core tips and their shared write-core gap. The width of read core 96 is preferably greater than that of the write-core tips to prevent the bursts recorded on the record member by comb transducers 25, 26 from having a surface area equal to the width of core 96. Because read core 96 is wider than the signals recorded using the write-core tips of transducers 26 and narrower than stripes 134, 135 (FIGS. 10 and 11) the magnitude of the signal output from transducer 28 will be significantly greater when the transducer detects a stripe than the signal generated by transducer 28 when it detects track-centering servo signals recorded by transducers 25 or 26. In the most preferred embodiment, core 100 is aligned with both the lowermost write-core tip 61 and slot 82, and has a width $W_2$, which is approximately equal to the width of such write-core tip and slot combined.

Optical sensor 31 (FIGS. 2 and 8) emits and collects light through aperture 30 (FIG. 2) in surface 23 using a light source (not shown) and photo-detector (not shown) comprising part of optical circuit 109. The primary purpose of optical sensor 31 is to monitor edge 106 of record member 21, and although optical sensor 31 may be implemented by use of a commercially available optical sensor unit, the use of such a device in a magnetic transducer to monitor the edge of a record member is believed to constitute a novel and desirable feature itself. Preferably, optical sensor 31 includes a light guide 32 comprised of multiple-optical fibers extending between optical circuit 109 (FIG. 8), and aperture 30 in surface 23 of head 20.

Figure 8:
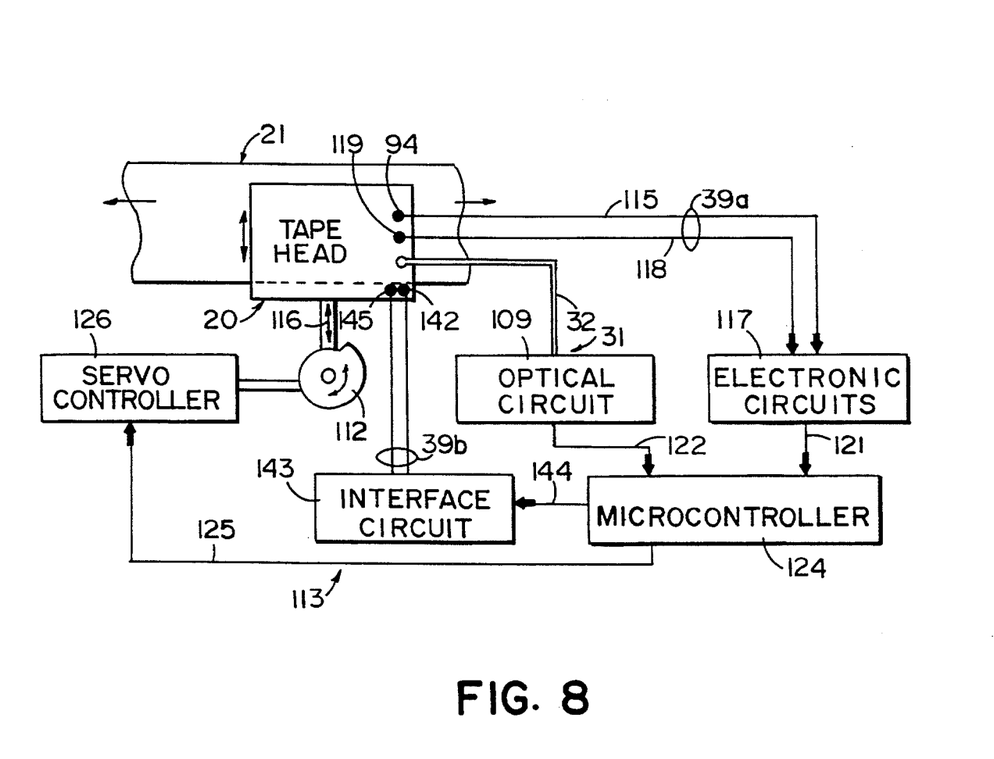
FIG. 8 is a system block diagram showing the nature of the storage apparatus (servo system and record member) used with the invention.

In such a preferred embodiment, some of the multiple fibers in light guide 32 are dedicated to channeling light from a source in circuit 109 to aperture 30, and other such fibers are dedicated to channeling light reflected back at aperture 30 to a photo-detector in the optical unit. Of course, a light guide having a monolithic structure could be used in place of the preferred multiple-fiber light guide, but such a configuration could obviously not simultaneously transmit light in two directions, as is true of the dedicated-fiber arrangement just noted, and other alternatives (such as synchronous modulation and detection) would have to be used. Also, a monolithic light guide would be less directional since light reflected off the record member would enter it from significantly more angles due to the larger diameter which such a guide would have to possess to ensure transmittal of sufficient light to operate properly. The individual fibers of the multiple-fiber light guide have significantly smaller openings for the light to enter, thereby reducing the amount of light entering each fiber, and supplied by the fibers to the optical sensor, or photo-detector, in circuit 109. Thus, a multiple-fiber light guide has a significantly higher resolution, such that the amplitude of the output signal of circuit 109 may be generally proportional relative to surface area of record member 21 positioned directly below 30.

Figure 2:
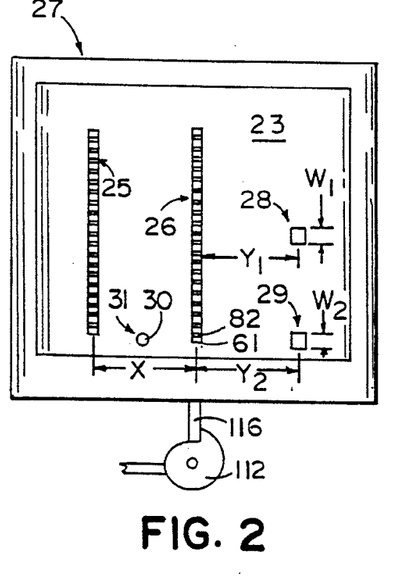
FIG. 2 is a front elevational view of a recording head according to the present invention.

Aperture 30 of optical sensor 31 is most preferably located between comb transducers 25, 26, and aligned with the lowermost write-core tip 61 and slot 82, as is the lower magnetic read transducer 29, as illustrated in FIGS. 2 and 6. The light guide 32 is substantially perpendicular to front surface 23 of head 20 and storage media 21 adjacent aperture 30 where the light exits and enters the light guide fibers, as best illustrated in FIG. 5, to insure that light emanating from aperture 30 and reflecting off of the adjacent surface 24 of media 21 will reflect back into aperture 30. The perpendicular relationship between light guide 32 and storage media 21 is assured by the overall cylindrical profile of comb transducers 28, 29, as the record member extends linearly across the front face of head 20 due to the transport tension on record member 21 and the forwardly-projecting position of head 20 relative to record member 21. The distance between aperture 30 and record member 21 is equal to the distanced between surface 23 and the write-core tips on transducers 25, 26.

One way to control the position of recording head 20 relative to storage media 21 during transport of the latter is to provide housing 27 with an integral support 111a (FIGS. 5 and 6) having a perpendicular positioning arm 116b or other such portion which slidably contacts, and rides the contoured surface of a position control element such as a cam 112 controlled by a servo-positioning system 113 (FIG. 8). The servo-positioning system 113 is coupled to transducers 28, 29 to receive input control signals therefrom, as described in greater detail hereinafter. More specifically, terminal 94 of the sense winding 97 (FIGS. 7 and 8) is electrically coupled to electronic circuit 117 by a conductor 115 and terminal 119 of sense coil 101 is electrically coupled to electronic circuit 117 by conductor 118. The electronic circuit 117 outputs signals which are coupled via signal bus 121 to microcontroller 124. In one embodiment of the invention, in addition to the electrical circuit 117, optical circuit 109 is coupled by light guide 32 to aperture 30 (FIG. 2) in head 20. A signal bus 122 is connected between optical circuit 109 and microcontroller 124 to supply a signal to microcontroller 124 which is proportional to the amount of light received by light guide 32 through aperture 30. Microcontroller 124 is coupled to a servo controller 126 via signal bus 125, which may utilize a stepper motor to drive cam 112, for example, which controls the position of head 20 relative to the record member 21. Particularly advantageous servo systems are described in U.S. Pat. No. 4,472,750, issued Sep. 18, 1984 to Klumpp et al., entitled DATA RECORD WITH PRERECORDED TRANSDUCER POSITIONING SIGNALS AND SYSTEM FOR UTILIZING SAME, and U.S. Pat. No. 4,586,094, issued Apr. 29, 1986 to Chambors et al., entitled METHOD AND APPARATUS FOR PRERECORDING TRACKING INFORMATION ON MAGNETIC MEDIA, which are assigned to the assignee of the present invention and the disclosures of which are incorporated herein by reference.

Figure 9:
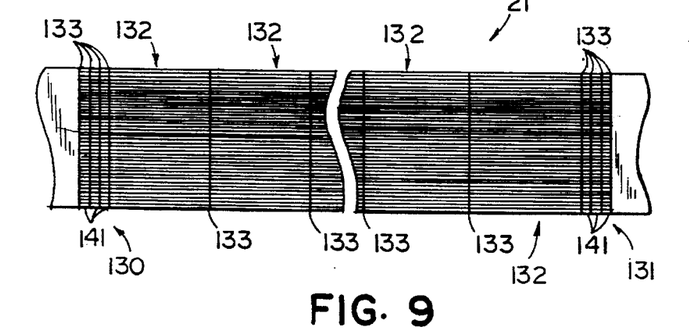
FIG. 9 is a fragmentary, pictorial view of one example of a record member used with the device of the present invention.
Figure 10:
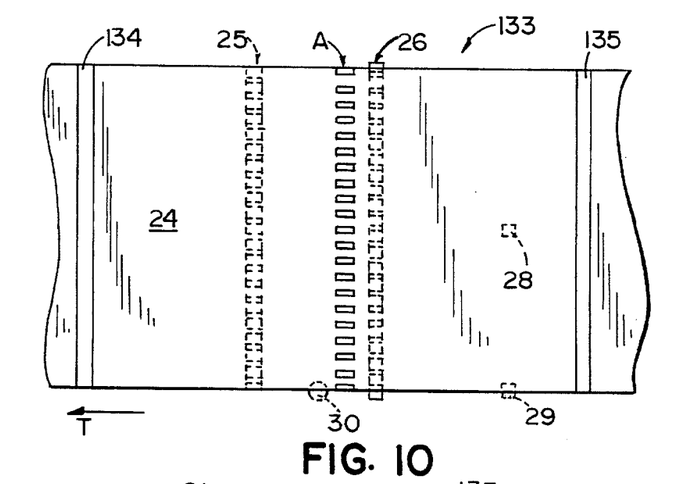
FIG. 10 is an enlarged, detailed, fragmentary, schematic view of the record member after one column of servo-tracking signals is recorded in a servo zone, with the position of the recording head illustrated thereon in phantom.
Figure 11:
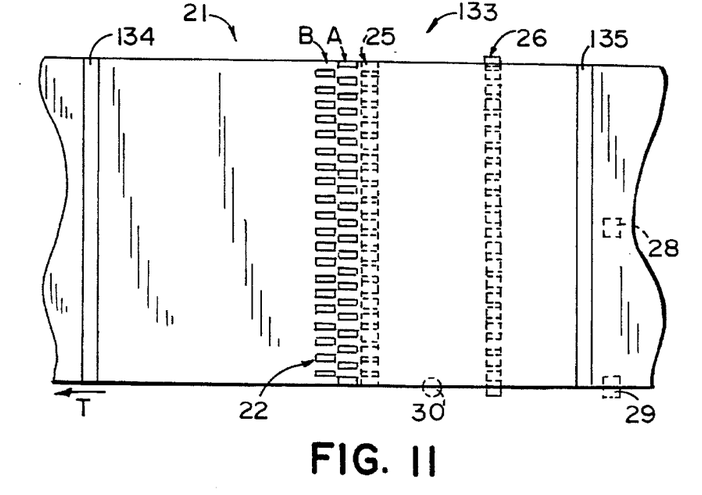
FIG. 11 is an enlarged, detailed, fragmentary, schematic view of the record member after a second column of servo-tracking signals is recorded in the servo zone, with the corresponding position of the recording head illustrated in phantom.

To more fully illustrate the purpose and function of the novel head 20, a record member format will now be described with reference to FIGS. 9, 10 and 11; it is to be noted, however, that a preferred record member format is described in greater detail in co-pending (later filed) patent application entitled MULTI-TRACK EMBEDDED SERVO RECORDING FORMAT AND METHOD, by Chambors et al., application Ser. No. 07/855,239 filed on Mar. 23, 1992. Record member 21 is preferably formatted to have dedicated or restricted areas 130 and 131 at its beginning and end, respectively, which are devoted exclusively to the presence of a prerecorded sequence of mutually-spaced, servo-tracking signals 133 and interspersed track-identifying signal regions 141. Between such end portions, record member 21 includes a large number of dedicated data-storage regions 132, which may be considered to be segregated or demarked from one another by recorded servo-tracking signals, designated by the numeral 133, and described more fully hereinafter. Dedicated areas 130 and 131, as well as the servo-tracking signals 133, include a pair of substantially parallel, spaced, stripes 134, 135 (FIG. 10) extending across the entire width of the record member, which define the longitudinal perimeters of a servo zone. The servo zones extend across the entire width of the record member 21. Servo-tracking signals 22 (FIG. 11) are recorded in the servo zone defined by stripes 134, 135 in the manner described hereinafter.

More particularly, and with reference to FIGS. 2, 7, 10 and 11, in operation the record member 21 is moved across surface 23 of recording head 20 by a suitable motor and drive (not shown), which may be of a conventional nature. The vertical stripes 134, 135 extending laterally across record member 21 are recorded thereon prior to recording of the servo-tracking signals 22 on the storage media. As record member 21 is transported past head 20, its read transducer 28 outputs a voltage proportional to the magnetic field recorded on the record member surface which is then passing across gap 104 of this transducer. Because the width of the recorded-data signals in the data tracks and of the servo-tracking signals is less than the width of core 96, whereas the recorded stripes 134, 135 are wider than core 96, transducer 28 will generate a maximum output signal level when stripes 134, 135 cross gap 104 in core 96. When the leading stripe 134 of each stripe pair crosses gap 104, the occurrence of the corresponding maximum signal level output from coil 97 of transducer 28 indicates to microcontroller 124 that a servo zone 133 is arriving at gap 104, responsive to which the microcontroller waits a predetermined time period as the record member passes the recording head in the direction indicated by arrow T, and then outputs an enabling signal to energize transducer 26. Transducer 26 is energized by a current of appropriate magnitude which is applied to terminal 138 (FIG. 3) to generate magnetic flux in the core 33, responsive to which the write-core tips 40–61 contacting record member surface 24 all simultaneously record substantially identical magnetic transitions on record member 21, in a pattern corresponding to that shown in column A, FIG. 10. The width of the write-core tips 40–61 of transducers 25, 26 is preferably the same as the width of the intervening write-core recesses 62–82, such that the servo-burst signals recorded by transducer 25 will be closely contiguous to, but not vertically overlap, the corresponding servo-burst signals recorded by transducer 26, each such horizontally spaced pair of vertically adjacent servo bursts having a common boundary which define the centerline of a data track.

Record member 21 continues to be transported past recording head 20 following the recording of signals in column A, and shortly thereafter, read core 96 senses the lagging servo-zone boundary stripe 135. Responsive to detection of such lagging stripe, microcontroller 124 generates a control signal which enables transducer 25 to record the column B servo-tracking signals. By detecting the second (lagging) servo-tracking boundary stripe 135 before recording the second column of servo-tracking signals, the system verifies that the servo-tracking signals are recorded in a servo zone. Additionally, although the system does not always record the two columns of servo signals in the exact center of the servo zone, the paired servo-zone stripes 134, 135 are used to assure that the centering signals are always recorded intermediate such stripes. Accordingly, the boundary of the servo zones 133 is preset and it is assured that the servo-tracking signals are in fact, positioned within a servo zone, and thus are not recorded in the dedicated data regions of the record member.

During the transport of record member 21 past head 20, coil 101 of transducer 29 outputs a voltage proportional to the extent to which the gap 105 in core 100 is covered by the record member, since transducer 28 outputs the maximum amplitude signal when the entire length of gap 105 (i.e., width of core 100) is crossed by the stripes 134, 135. Because the amount of flux generated within core 29 varies with variations in the surface area of stripes 134, 135 as they cross gap 105, the amplitude of the signal output from coil 101 varies accordingly and the output signal from coil 101 may thus be used as an edge-of-tape indicator, and applied as a control signal for the servo system. The servo system is most preferably responsive to this control signal, to adjust the position of recording head 20 relative to the width of the record member 21.

In addition to magnetic read transducer 29, an optical sensor 31 is provided which includes a circuit 109 (FIG. 8) outputting a signal on bus 122 proportional to the amount of surface area of record member 21 which is in registration with aperture 30 throughout the transport of record member 21 over recording head 20, and regardless of whether or not the record member is being moved. The output signal from the optical circuit 109 is preferably averaged periodically to prevent imperfections in the record member (including irregular edge portions) from indicating lateral tape movement to microcontroller 124 if the tape does not in fact wander. The averaged signal generated by optical circuit 109 is used as a reference such that the servo system adjusts the position of recording head 20 to maintain this averaged signal at a constant level.

The optical sensor 31 is particularly advantageous as it does not utilize signals recorded on the record member to monitor the relative positioning of the recording head 20 and record member 21. This allows the recording head position to be monitored and adjusted throughout the transport of the record member and assures proper positioning of the data tracks along the tape or other media without necessitating the recording of track-identifying signals at each servo zone. Accordingly, the amount of surface area required to store servo-tracking signals can be correspondingly decreased without affecting reliability. In a particularly advantageous embodiment of the invention, the magnetic transducers 28, 29 and the optical sensor 31 are used in combination to sense the lateral and longitudinal position of the recording head 20 relative to record member 21. The averaged control signal generated by optical sensor 31 is used continuously to monitor the edge of the record member 21 and thus provides an indication of the position of the recording head relative to the record member throughout the travel of the record member. The position detected by the optical sensor is verified by the signal level output from transducer 29 when each pair of stripes 134, 135 pass beneath the transducer. Of course, the optical sensor 31 or the magnetic sensors may be advantageously utilized individually and with transducers other than comb transducers 25, 26.

Thus, it can be seen that a highly accurate recording head is disclosed which includes transducers 25, 26 energized to record a plurality of magnetic signals on the record member simultaneously. Each of the transducers 25, 26 has a single multi-tip write core which, when energized, writes the same magnetic transition pattern on all of the tracks using each of a plurality of precisely configured gaps in the core, thereby providing uniform signals which are consistently aligned both laterally and longitudinally on the record member with heretofore-unobtainable accuracy and precision. Accordingly, the multi-tip transducers of the present invention permit a reduction in the size and spacing of the servo-tracking signals and a corresponding, significant increase in the number of tracks which can be provided on the record member 21. Additionally, an optical sensor and a magnetic sensor are disclosed as a part of the overall head, which provide control signals to a servo system whereby the position of the head can be laterally adjusted relative to the record member throughout transport of the record member past the transducer.

It is to be understood that the foregoing description of the preferred embodiment of the invention is provided for purposes of description and illustration, and not as a measure of the invention, whose scope is to be defined by reference to the ensuing claims. Thus, those skilled in the art may devise embodiments of the particular concepts presented in the foregoing illustrative disclosure which differ from the particular embodiments shown and described in detail herein, or may make various changes in structural details to the illustrated embodiment. Accordingly, all such alternative or modified embodiments which utilize the underlying concepts of the invention and incorporate the spirit thereof are to be considered as within the scope of the claims appended therebelow, unless such claims by their language specifically state otherwise. Established principles of patent law, including the doctrine of equivalents.

The embodiments of the invention in which an exclusive property or privilege is claimed are defined as follows:

1. A system for recording a plurality of track-centering servo signals on a multi-track magnetic medium, wherein the medium moves in a first direction during said recording of servo signals and is prone to wander in a substantially transverse, second direction during said recording of servo signals, said system comprising:

a movable first transducer, operatively engageable with the magnetic medium, said first transducer including a corresponding first magnetic core having a first plurality of write-core tips at the ends of fingers projecting from the first magnetic core, the first plurality of write-core tips being aligned one to the next along the second direction and being spaced apart each from next-adjacent other tips by a corresponding first plurality of magnetic gaps; and transducer moving means for moving the first transducer along said second direction;

wherein the first transducer simultaneously generates a first plurality of magnetic transitions across the first plurality of magnetic gaps and thereby simultaneously records a first plurality of track-centering servo signals on said magnetic medium when the first transducer is energized and is operatively engaged with the magnetic medium; and wherein after their recordation, said first plurality of track-centering servo signals are usable for centering a magnetic head relative to a desired track of said multi-track magnetic medium.

2. The multi-track servo recording system as defined in claim 1, wherein the magnetic medium has a magnetically distinguishable landmark feature, and wherein the system further comprises:

magnetic landmark sensing means disposed operatively for magnetically sensing the position of the movable first transducer relative to the magnetically distinguishable landmark feature of the magnetic medium; and wherein during the recording of said track-centering servo signals said transducer moving means is responsive to the magnetic landmark sensing means for moving the first transducer along said second direction to desired positions relative to said magnetically distinguishable landmark feature.

3. The multi-track servo recording system as defined in claim 2, wherein said magnetically distinguishable landmark feature is a magnetic edge of the medium and wherein said magnetic landmark sensing means includes a first read core that is positionable partially over the magnetic edge of the medium at the same time that said first magnetic core having said first plurality of write-core tips is positioned to extend in the second direction across at least a bulk portion of the medium, said first read core being for outputting a signal indicating the position of the first transducer along the second direction relative to said magnetic edge.

4. The multi-track servo recording system as defined in claim 2, wherein said magnetic medium has pre-recorded thereon position marking stripes extending in the second direction and the servo recording system further includes:

a second read core positioned a predefined distance along the first direction from the first transducer and further positioned over the medium for sensing the pre-recorded position marking stripes during the recording of said track-centering servo signals and for thereby determining, during the recording of said track-centering servo signals, the position along the first direction of the first transducer relative to the pre-recorded position marking stripes.

5. The multi-track servo recording system as defined in claim 4, wherein said write-core tips of the first transducer and gaps of said first and second read cores are positioned on an operative surface of a common head such that the medium engages operatively with said write-core tips and the gaps of said read cores for recording servo signals on the medium as said medium passes over said surface of said head.

6. The multi-track servo recording system as defined in claim 1, wherein:

the multi-track magnetic medium extends a first distance along the second direction; and the write-core tips of said first plurality are distributed uniformly along the second direction over a distance approximately equal to said first distance.

7. The multi-track servo recording system as defined in claim 1, wherein:

the recordable surface of the multi-track magnetic medium extends a first distance along the second direction; and the spaces between said write-core tips of said first plurality cover approximately 50% or more of said first distance.

8. The multi-track servo recording system as defined in claim 1 wherein said multi-track magnetic medium is for storing a plurality of information tracks and wherein a separate servo signal is recorded for each of said information tracks.

9. A system for recording a plurality of track centering servo signals on a multi-track magnetic medium, wherein the medium moves in a first direction during said recording and is prone to wander in a substantially transverse, second direction during said recording, said system comprising:

a movable first transducer, operatively engageable with the magnetic medium, said first transducer including a corresponding first magnetic core having a first plurality of write-core tips projecting therefrom, the first plurality of write-core tips being aligned one to the next along the second direction and spaced apart from one another by a first plurality of magnetic gaps:

transducer moving means for moving the first transducer along said second direction;

wherein the first transducer simultaneously generates a first plurality of magnetic transitions across the first plurality of magnetic gaps and thereby simultaneously records a first plurality of track-centering servo signals on said magnetic medium when the first transducer is energized and is operatively engaged with the magnetic medium;

said system further including:

a movable second transducer, spaced apart from the first transducer and operatively engageable with the magnetic medium, said second transducer including a corresponding second magnetic core having a second plurality of write-core tips projecting therefrom, the second plurality of write-core tips being aligned one to the next along the second direction and spaced apart from one another by a second plurality of magnetic gaps;

wherein the transducer moving means is operatively coupled to move the second transducer along said second direction;

wherein the second transducer simultaneously generates a second plurality of magnetic transitions across the second plurality of magnetic gaps and thereby simultaneously records a second plurality of track-centering servo signals on said magnetic medium when the second transducer is energized and is operatively engaged with the magnetic medium; and wherein the first and second transducers are positioned relative to one another such that at least one of the second plurality of magnetic transitions is interleaved between two of the first plurality of magnetic transitions.

10. The multi-track servo recording system as defined in claim 9, wherein the magnetic medium has an optically distinguishable landmark feature, and wherein the system further comprises:

optical landmark sensor means disposed operatively between the spaced apart first and second transducers, for sensing the positions of the first and second transducers relative to said optically distinguishable landmark feature of the magnetic medium; and wherein said transducer moving means is responsive to the optical landmark sensor means for moving the first and second transducers along said second direction to desired positions relative to said landmark feature.

11. The multi-track servo recording system as defined in claim 10, wherein the magnetic medium is an elongated tape having a recording face defined between opposed longitudinal edges and said optically distinguishable landmark feature of the magnetic medium is a prespecified one of the longitudinal edges of the tape; and wherein said optical sensor means includes a bidirectional light guide positioned over the prespecified edge and substantially at right angles to the recording face of the magnetic medium for bouncing light off the prespecified edge of the recording face and through measurement of the reflected light, sensing the position of the prespecified edge relative to said first and second transducers.

12. The multi-track servo recording system as defined in claim 11, wherein said optical sensor means further includes a light source and a light detector, and said bidirectional light guide includes a plurality of optical fibers, at least some of said fibers being adapted to transmit light from said light source to illuminate the prespecified edge of the recording face and other of said fibers being adapted to receive transmitted light reflected from said face and transmit such light to said light detector.

13. A movable recording head for recording a plurality of servo-tracking signals on a magnetic record member, wherein the record member moves in a first direction during said recording and is prone to wander in substatially transverse, second direction during said recording, the head comprising:

a movement member for moving the head along the second direction;

a first transducer including a plurality of substantially uniformly spaced-apart write tips linearly aligned one to the next along the second direction, each write tip being at an end of a respective finger, the spaces between the write tips defining magnetic gaps for recording servo-tracking signals on the magnetic record member; and a magnetizing coil operatively coupled to said tips for inducing a simultaneous flow of magnetic flux across the gaps of said tips.

14. The recording head as defined in claim 13, further including:

a second transducer for recording servo-tracking signals on the magnetic record member, said second transducer having a structure substantially the same as said first transducer, the write tips of the second transducer being spaced apart and substantially parallel to the write tips of the first transducer; and magnetizing means operatively coupled said tips of the second transducer for inducing a simultaneous flow magnetic flux across the gaps of said tips of the second transducer.

15. The recording head as defined in claim 14, further including an optical position sensing means for sensing the positions of the first and second transducers relative to an optically distinguishable landmark on the record member.

16. The recording head as defined in claim 15, further including a magnetic position sensing means for sensing the positions of the first and second transducers relative to a magnetically distinguishable landmark on the record member.

17. The recording head as defined in claim 16, wherein said recording head has an operative surface across which the record member moves in said first direction;

wherein the write tips of the first and second transducers and a gap of said magnetic position sensing means are carried on the same operative surface of said recording head such that the record member operatively engages with the write tips and the gap of the magnetic position sensing means as the record member moves across said head, and wherein said optical sensing means is positioned on the same operative surface to remain spaced apart from the record member as the record member moves across the operative surface of the head.

18. A movable recording head for recording a plurality of servo-tracking signals on a magnetic record member, wherein the record member moves in a first direction past the head during said recording and is prone to wander in a substanially transverse, second direction during said recording, wherein the record member is dimensioned to extend a predefined distance in the second direction, and wherein the recording member has an optically distinguishable landmark feature which moves in the second direction if the recording member wanders in the second direction, said head comprising:

a magnetic transducer for simultaneously recording the plural servo-tracking signals onto the magnetic record member and for distributing said recorded servo-tracking signals substantially across the second direction extent of the record member as the record member moves in the first direction; and an optical position sensor for sensing the position of the magnetic transducer along the second direction relative to the optically distinguishable landmark feature;

wherein said optical sensor includes a bidirectional light guide for operative coupling to a light source and a photodetector, wherein the bidirectional light guide has an optically transmissive end positioned for bouncing light off the optically distinguishable landmark feature of the record member, and through measurement of reflected light, sensing the position of the optically distinguishable landmark feature relative to said magnetic transducer;

wherein said magnetic transducer includes a one-piece magnetic write-core having a plurality of spaced apart write tips each at an end of a respective finger projecting from the write core, wherein said tips are distributed and aligned one to the next along the second direction, and wherein the spaces between the write tips define magnetic gaps across which magnetic transitions develop for simultaneously recording said servo-tracking signals on the magnetic record member.

19. The recording head as defined in claim 18, wherein said head includes a second one-piece magnetic write-core having a structure substantially the same as the first recited one-piece magnetic write-core, the first and second magnetic write-cores being in spaced-apart relation to one another, and wherein said optically transmissive end of the light guide is positioned between the spaced-apart first and second magnetic write-cores.

20. A recording head for recording a plurality of servo-tracking signals on a magnetic record member, wherein the record member moves in a first direction past the head during said recording and is prone to wander in a substantially transverse, second direction during said recording, and wherein the record member has a plurality of magnetically distinguishable landmark feature which move in the first direction as the record member move in the first direction and which also move in the second direction if the record member wanders in the second direction, said head comprising:

a first transducer for simultaneously recording the plural servo-tracking signals on the magnetic record member as the record member moves in the first direction; and first and second magnetic read cores for sensing the position of the recording head relative to the record member along the first and second directions, said first magnetic read core being operatively positioned for sensing movement of the magnetically distinguishable landmark features in the first direction relative to the recording head, and said second magnetic read core being operatively positioned for sensing movement of the magnetically distinguishable landmark features in the second direction relative to the recording head;

wherein said first transducer includes a one-piece magnetic write-core having a plurality of spaced apart write tips each at an end of a respective finger projecting from the write-core, wherein said tips are distributed and aligned one to the next along the second direction, and wherein the spaces between the write tips define magnetic gaps across which magnetic transitions develop for recording said servo-tracking signals on the magnetic record member.

21. The recording head as defined in claim 20, wherein said one-piece magnetic write-core is D-shaped and said transducer includes a coil operatively coupled to said core for energizing the core.

22. The recording head as defined in claim 21, wherein said recording head includes a second transducer having a structure substantially the same as the first transducer and wherein the write tips of the second transducer are in spaced-apart parallel relation to the write tips of the first transducer.

23. The recording head as defined in claim 20, wherein the record member medium has an optically distinguishable landmark feature which moves in the second direction if the record member wanders in the second direction, the recording head further including an optical position sensor operatively positioned for sensing the position along the second direction of the recording head relative to the optically distinguishable landmark feature.

24. The recording head as defined in claim 22, wherein said optical position sensor includes a plurality of optical fibers, a light source, and a light detector, a first subset of said optical fibers transmitting light from said light source to the optically distinguishable landmark feature and a second subset of said optical fibers transmitting light reflected from said optically distinguishable landmark feature to said light detector.

25. A magnetic transducer for simultaneously recording a plurality of track-identifying servo signals on a magnetic recording medium, the transducer comprising:

a body;

a plurality of spaced apart write tips extending out in parallel from the body for conducting magnetic flux, the spaces between the parallel tips defining magnetic gaps across which said flux flows; and energizing means, magnetically coupled to the tips, for inducing a serial flow of magnetic flux from one tip to the next across said magnetic gaps.

26. A magnetic transducer according to claim 25 wherein said tips are uniformly spaced from one another and substantially equal amounts of flux flow across each of said magnetic gaps.

27. A magnetic transducer according to claim 25 wherein said body is a one-piece magnetic core and the tips are integral parts of the one-piece magnetic core.

28. A magnetic transducer according to claim 27 wherein said tips are semi-cylindrical in shape.

29. A magnetic transducer according to claim 28 wherein said one-piece magnetic core is D-shaped, the tips are integrally formed extending outwardly from the straight leg of the D-shape, and the energizing means consists of a coil wrapped about the curved portion of the D-shape.

* * * * *